United States Patent
Chatterjee et al.

(10) Patent No.: US 11,625,928 B1
(45) Date of Patent: Apr. 11, 2023

(54) LANGUAGE AGNOSTIC DRIFT CORRECTION

(71) Applicant: Amazon Technologies, Inc., Seattle, WA (US)

(72) Inventors: Tamojit Chatterjee, Shyamnagar (IN); Mayank Sharma, Bhopal (IN); Muhammad Raffay Hamid, Seattle, WA (US); Sandeep Joshi, Bangalore (IN)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 294 days.

(21) Appl. No.: 17/009,311

(22) Filed: Sep. 1, 2020

(51) Int. Cl.
| | |
|---|---|
| *G06F 17/00* | (2019.01) |
| *G06V 20/62* | (2022.01) |
| *G11B 27/10* | (2006.01) |
| *G06N 7/00* | (2023.01) |
| *G06F 40/169* | (2020.01) |
| *G06V 20/40* | (2022.01) |

(52) U.S. Cl.
CPC .......... *G06V 20/635* (2022.01); *G06F 40/169* (2020.01); *G06N 7/005* (2013.01); *G06V 20/40* (2022.01); *G11B 27/10* (2013.01); *G06V 20/44* (2022.01)

(58) Field of Classification Search
CPC ...... G06V 20/635; G06V 20/40; G06V 20/44; G06F 40/169; G06N 7/005; G11B 27/10
See application file for complete search history.

(56) References Cited

U.S. PATENT DOCUMENTS

| | | | | |
|---|---|---|---|---|
| 8,825,489 B2 * | 9/2014 | Scoggins, II | .......... | G11B 27/28 704/235 |
| 8,826,354 B2 * | 9/2014 | Pham | .................... | H04N 17/04 348/468 |
| 8,878,913 B2 * | 11/2014 | Eyer | .................... | H04N 13/189 348/51 |
| 8,947,596 B2 * | 2/2015 | Schmidt | ................. | G11B 27/10 704/235 |
| 9,661,393 B2 * | 5/2017 | Hundemer | ......... | H04N 21/4882 |
| 9,674,351 B1 * | 6/2017 | Mason | ................ | H04M 3/5183 |
| 9,674,475 B2 * | 6/2017 | Hundemer | ............ | H04N 17/00 |
| 9,699,404 B2 * | 7/2017 | Cronin | ................. | H04N 7/0885 |
| 9,826,257 B2 * | 11/2017 | Xiong | .............. | H04N 21/23424 |
| 9,973,793 B2 * | 5/2018 | Zhang | ................ | H04N 21/4302 |

(Continued)

*Primary Examiner* — Mohammed H Zuberi
(74) *Attorney, Agent, or Firm* — Eversheds Sitherland (US) LLP

(57) ABSTRACT

Systems, methods, and computer-readable media are disclosed for language-agnostic subtitle drift detection and correction. A method may include determining subtitles and/or captions from media content (e.g., videos), the subtitles and/or captions corresponding to dialog in the media content. The subtitles may be broken up into segments which may be analyzed to determine a likelihood of drift (e.g., a likelihood that the subtitles are out of synchronization with the dialog in the media content) for each segment. For segments with a high likelihood of drift, the subtitles may be incrementally adjusted to determine an adjustment that eliminates and/or reduces the amount of drift and the drift in the segment may be corrected based on the drift amount detected. A linear regression model and/or human blocks determined by human operators may be used to otherwise optimize drift correction.

20 Claims, 6 Drawing Sheets

(56) References Cited

U.S. PATENT DOCUMENTS

| | | | |
|---|---|---|---|
| 10,019,995 B1* | 7/2018 | Abramovitz | G09B 5/04 |
| 10,095,367 B1* | 10/2018 | Berry | H04N 21/234363 |
| 10,192,588 B2* | 1/2019 | Liu | G11B 27/322 |
| 10,306,324 B2* | 5/2019 | Clarke | G11B 27/105 |
| 10,341,694 B2* | 7/2019 | Xu | H04N 21/8133 |
| 10,347,300 B2* | 7/2019 | Klinger | G11B 27/036 |
| 10,692,497 B1* | 6/2020 | Muske | G11B 27/031 |
| 11,445,266 B2* | 9/2022 | Maurice | H04N 21/4884 |
| 2010/0039558 A1* | 2/2010 | Detore | G11B 27/10 |
| | | | 348/E7.001 |
| 2011/0050995 A1* | 3/2011 | Ozawa | H04N 21/4884 |
| | | | 348/E7.001 |
| 2011/0134321 A1* | 6/2011 | Berry | H04N 21/43074 |
| | | | 348/464 |

* cited by examiner

LANGUAGE AGNOSTIC DRIFT CORRECTION

BACKGROUND

Media content is increasingly being produced and formatted in different languages with subtitles and captions. Subtitles and captions are useful for both hearing impaired individuals and other individuals that desire to supplement the audio with text. However, subtitles and captions may become out of sync with the corresponding audio that is presented, creating an undesirable experience for a viewer and listener. Some methods of detecting subtitles and captions that are out of sync with audio may be language-dependent and/or may be susceptible to errors caused by background noise. Therefore, devices and users may benefit from enhanced subtitle and caption synchronization.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
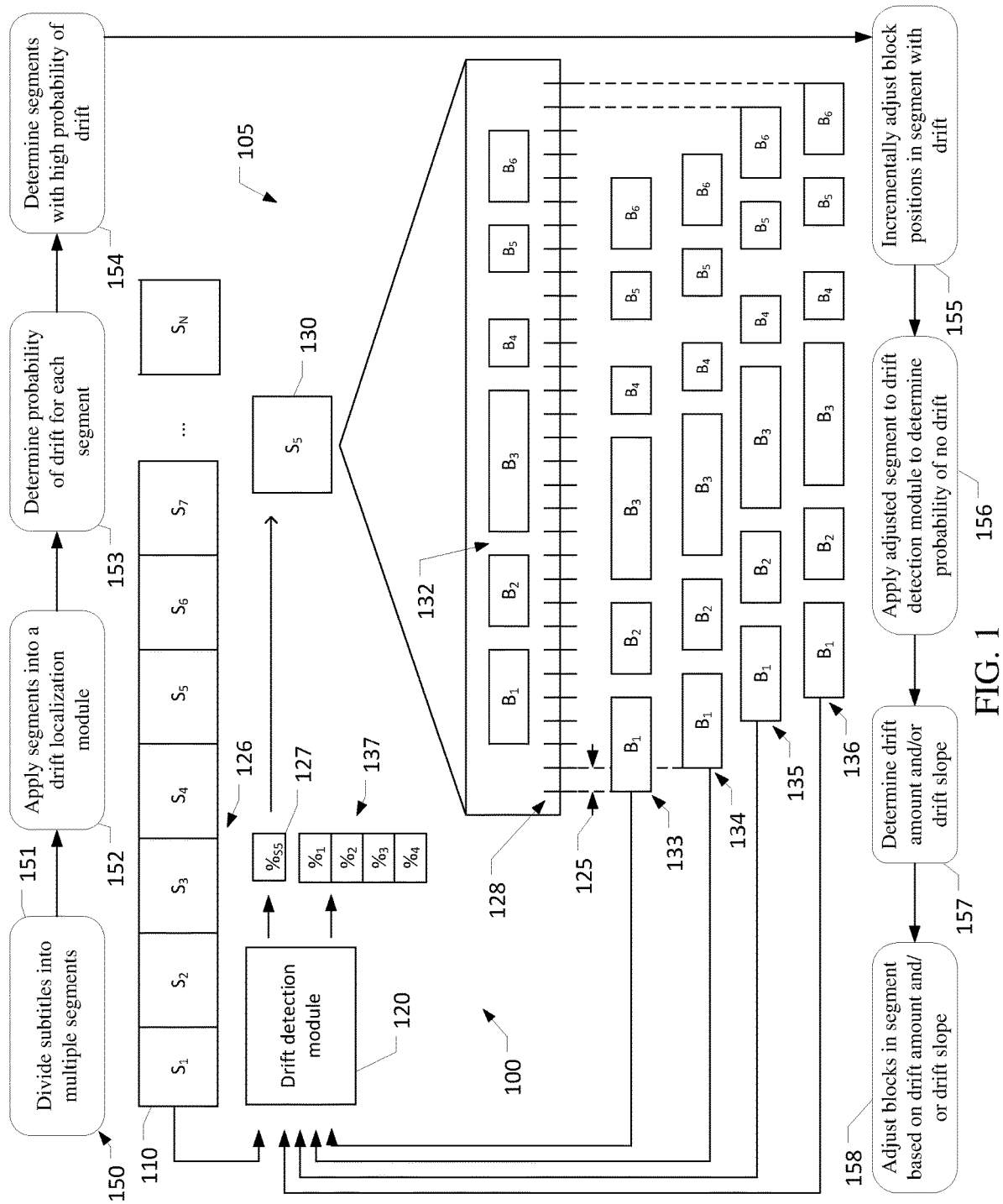
FIG. 1 illustrates an example system for subtitle drift detection and correction, in accordance with one or more example embodiments of the present disclosure.

Example embodiments described herein provide certain systems, methods, and devices for language-agnostic subtitle drift detection, localization and correction.

Subtitles and captions (used interchangeably herein) may supplement audio (e.g., audible dialog) presented in media content such as movies, television, music, and other audio and video mediums and applications. Media content may be encoded using a frame rate, but playback of the encoded media content may occur at a rate different than the frame rate, resulting in a phenomenon known as drift, in which the displayed subtitles do not correspond (e.g., in time) with the audio. For example, the subtitles may lag behind the audio or may be presented before the corresponding audio is presented. Drift may be the result of other factors as well, such as when frames of video are added or removed (e.g., added or removed scenes) for different versions of the video, such as versions in different countries, theatrical versions, cable movie versions, edited versions, and the like. When video frames are removed from or added to a video, the subtitles may need to be updated to reflect the modification so that subtitles or captions are not presented for removed video frames or so that video frames are not presented without subtitles or with the incorrect subtitles.

Some methods of generating subtitles may use speech recognition. For example, some computer systems (e.g., machine learning systems) may recognize spoken language presented in media content (e.g., audio) and may translate the spoken language into subtitles. Some speech recognition subtitle methods may be language dependent, affected by background noise, which may be significant for movies and television, and may not allow for subtitles in a different language than the spoken language of the corresponding content. Some methods of detecting subtitle drift may identify where, within the video, subtitle drift may occur. For example, some cases of drift may start and end within a small region of video (e.g., a few minutes).

In one or more embodiments, subtitle drift detection and localization may be language-agnostic, allowing for the detection of subtitle drift when the subtitles are in a different language than the spoken audio, or when the subtitles are in the same language as the spoken audio. The subtitle drift detection combined with localization of the subtitle drift may detect where (e.g., within a five-minute segment of video) subtitle drift occurs, allowing for efficient mitigation of the drift.

In one or more embodiments, a method of subtitle drift detection and localization may determine whether a subtitle is synchronized with corresponding spoken audio, and/or may localize the subtitle drift to a region (e.g., segment) of the corresponding video.

In one or more embodiments, subtitle drift detection and localization may use a voice detector and subtitle guidelines to identify when voices may be presented in video content, and may use subtitles (e.g., provided by human operators and that provide the text that corresponds to the words spoken by the voices in the video content at respective times) to generate machine blocks with start and end times. The machine blocks may be used to detect subtitle drift.

The drift detection module (e.g., drift localization module) described herein is described in greater detail in U.S. patent application Ser. No. 16/809,940, the entire contents of which are incorporated herein by reference.

In one or more embodiments, to detect, localize and correct drift, media content and/or corresponding audio may be analyzed by a computer system to translate spoken language into subtitles. The subtitles may be segmented into multiple segments. For example, the entirety of the subtitles in the media content may be divided into roughly five minute segments. Each segment may contain several subtitle blocks that each include a start and end time of the subtitle blocks present in that segment. Each segment may include text corresponding to the subtitles and/or information indicative of the subtitles (e.g., text data). Each segment may then be applied to a drift detection module which may include a drift detection algorithm (e.g., drift localization algorithm) to determine the likelihood of drift for each segment. Segments for which the likelihood of drift satisfies a threshold (e.g., above 50%) may be determined and identified as having drift. For the segments with drift, the blocks in each segment may be incrementally adjusted at step values (e.g., shifted certain amounts) to cause synthetic drift and generate new modified segments. For example, the blocks in the drift segments may be shifted at steps of 100 milliseconds starting from −1000 to +1000 milliseconds. Each modified segment may be applied to the drift detection algorithm and the likelihood of drift at each modified segment at the step values may be determined. The N amount of modified segments with the highest likelihood of drift may be determined. In one example, N may be 5. The step values corresponding to the N amount of modified segments may then be averaged to determine a drift amount for that respective segment. To correct the drift amount, the drift amount for the next segment may be determined as well as the rate of change of drift between the segment in question and the next segment (e.g., drift slope). The amount of drift and the drift slope may then be used to determine an amount a drift correction value to be applied to all blocks in the segment in question to correct (e.g., reduce or remove drift) in the segment. The same process may be repeated for all segments in the media content and/or the segments for which drift is detected.

The accuracy of the drift determination may be improved by applying a linear regression model to remove outlier drift amounts. For example, the segments and their respective drift amounts may be plotted and a linear regression model based on the drift amounts and the start and end times of each segment may be determined and similarly plotted. For each segment, a drift difference may be determined by determining a difference between the linear regression line and the drift amount for that segment. For the drift differences, median, standard deviation and mean values may be determined. Outlier segments (e.g., segments for which the amount of drift is significantly different than the linear regression line) may be determined based on a threshold and/or range value that is calculated using on the media, standard deviation and/or mean values. For those segments for which the drift is significantly different than the linear regression line (e.g., the outlier segments), the drift amount for that segment may be replaced with the drift amount determined by the linear regression line. The segments and their drift amounts, including the replaced drift amounts, may be plotted once again and a new linear regression model may be determined based on the updated plot. The updated linear regression line may then be used to determine an updated drift amount at each segment. The updated drift amount may then be used to correct drift.

Alternatively, or additionally, the drift amount for each segment may be fine-tuned by comparing the blocks in a segment to human blocks. Human blocks corresponding to the media content may be determined. For example, human operators may generate human blocks indicating probabilities that subtitles occur in corresponding audio blocks for the same video content used to produce the machine blocks. In this manner, a block (e.g., machine block) may refer to a computer-generated block of audio that corresponds to a portion of a media content (e.g., video), and for which a probability may indicate the likelihood that audio/voices are present during the block of video. A human block may refer to a block of audio that corresponds to a portion of the media content used to generate the machine block, and during which subtitles for the video are present.

In one or more embodiments, machine blocks may be mapped to human blocks generated from a human-generated subtitle file. To map the machine blocks to human blocks for a given segment, machine blocks and human blocks may be positioned with respect to time (e.g., start and end time in the time frame of the media content), and machine blocks overlapping in time with only one human block may be identified. The machine blocks mapped to only one human block (e.g., mapped blocks) that have a block length that is within a certain range and of a length of the corresponding human block may be identified as an anchor block (e.g., start and stop times of such machine block may be anchor points). For example, the range may be set at less than or equal to 500 ms. After detecting anchor blocks and corresponding human blocks, block features such as a start gap (e.g., the start time of a first human block minus the start time of a first machine block, representing a time gap from the start of a human block having spoken audio to the time when the overlapping machine block having spoken audio begins), end gap (e.g., the end time of the last human block minus the end time of the last machine block, representing a time gap from the end of the human block having spoken audio to the time when the overlapping machine block having spoken audio ends) may be determined. The start and end gaps may indicate times when a voice is present in the audio content for a video, but a subtitle is not present.

To fine-tune the drift segments, the blocks in each segment may be incrementally adjusted (e.g., shifted) at step values to cause synthetic drift and generate new modified segments. For example, the blocks in the drift segments may be shifted starting from −1000 to +1000 milliseconds with a shift step of 50 milliseconds to generate modified segments. For each modified segment, the start gap of the first anchor block and end gap of the last anchor block may be calculated and may together be summed to determine a gap sum. The modified segment with the gap sum closest to 0 (e.g., the smallest gap sum) may be determined as well as the corresponding step used to adjust that segment. The step that cause the modified segment to have the smallest gap sum, compared to the other modified segments, may be applied to the drift segment to further correct the drift (e.g., fine-tune the drift correction) in that respective segment.

Referring to FIG. 1, an example use case 100 for determining drift in segments of subtitles and correcting the detected drift is illustrated in accordance with one or more example embodiments of the disclosure.

The system and method illustrated in FIG. 1 may run on one or more computing devices, such as a server. The computing device may be and/or include datastores, databases and the like, and/or any other device designed to save or otherwise store digital information. The computing device (e.g., server) is described in greater detail below with respect to FIG. 7.

The computing device may run drift correction system 105 which may run one or more modules to analyze media content (e.g., videos) and determine subtitles and/or captions from the media content. For example, the system 105 may use a voice detector and subtitle guidelines to identify when voices may be presented in media content, and may use subtitles to generate machine blocks (e.g., blocks) corresponding to dialog with start and end times. The drift correction system 105 may further run one or more modules to segment the subtitles and/or captions into N segments of subtitles, each segment including blocks with start and end times. The drift correction system 105 may further analyze each segment using drift detection module 120 to determine drift segments (e.g., segment 130) having a high probability of drift. The drift correction system 105 may further process drift segment 130 with a drift correction module to incrementally modify blocks 132 of drift segment 130, which may be machine blocks, to generate synthetic drift in blocks 132 and ultimately modified drift segments. The drift detection module may process the modified drift segments to determine the likelihood of drift 137 for each modified drift segment. From the likelihood of drift 137, drift amounts corresponding to drift segments with the highest likelihood of drift may be determined and used to correct the drift detected in drift segment 130. As explained above, drift detection module 120 is described in U.S. patent application Ser. No. 16/809,940.

To initiate the actions determining drift in a segment and correcting the drift detected, an example process flow 150 is presented and may be performed, for example, by one or more modules at a computing device (e.g., server). For example, the computing device may include at least one memory that stores computer-executable instructions and at least one processor configured to access the at least one memory and execute the computer-executable instructions to perform various actions or operations, such as one or more of the operations in the process flow 150 of FIG. 1.

At block 151, subtitles corresponding to media content may be generated and divided in segments. For example, subtitles 110 may be determined by drift correction system 105 and/or obtained by drift correction system 105 and may be divided into N segments 126. The segments may have start and end times and each segment 126 may include blocks that include start and end times that correspond to time points in the media content. In one example, the subtitles may be divided into 5 minute segments (e.g., N=5). For example, if the media content is 60 minutes long, the subtitles may be divided into twelve 5 minute segments.

At block 152, the segments 126 may each be applied to drift detection module 120 to determine a likelihood of drift for each segment 126. At block 153, the likelihood and/or probability of drift is determined for each segment. As explained above, the likelihood and/or probability of drift may correspond to a likelihood that the subtitles for that given segment is out of sync with corresponding spoken audio. For example, the likelihood of drift 127 may be determined for segment $S_5$. In one example, a likelihood of drift may be 0.9 which may correspond to a 90% probability of drift. Alternatively, the likelihood that the subtitles are synchronized with the corresponding spoken audio may be detected. For example, a likelihood of no drift may be 0.1 which may correspond to a 10% probability of no drift and a 90% probability of drift.

At block 154, segments with a high probability of drift (e.g., low probability of no drift) may be determined. For example, a threshold value may be determined to identify segments with drift. In one example, the threshold value may be 70%. In this example, if the probability of drift determined by the drift detection module is 70% or higher (e.g., a value of 0.7 or higher), then the corresponding segment is determined to have drift. For example, the likelihood of drift 127 corresponding to section 130 (segment $S_5$) may be 80% and thus segment 130 may be determined to have drift.

At block 155, for segments determined to have drift, the blocks in each segment may be incrementally adjusted at certain steps and within a certain range to generate modified segments at each step. For example, as shown in FIG. 1, blocks 132 of segment 130 may be initially positioned along time frame 128 which may correspond to the audio and/or dialog of the media content. To generate modified segments, blocks 132 may be shifted by a step, such as step 125. In one example, the step may be 100 milliseconds and the range may be between −10 and 10 seconds, resulting in 200 unique modified segments, each corresponding to a unique step. In FIG. 1, modified segments 133-136 may each correspond to a different step. For example, modified segment 133 may correspond to −200 ms, modified segment 134 may correspond to −100 ms, modified segment 15 may correspond to 100 ms, and modified segment 136 may correspond to 200 ms.

At block 156, the modified segments (e.g., modified segments 133-136) may be applied to drift detection module 120 which may output a likelihood and/or probability of no drift for each modified segment. Drift correction system 105 may determine N modified segments having the highest likelihood and/or probability of no drift. In one example, the drift correction system 105 may determine 5 modified segments (e.g., K=5) having the highest probability of no drift. For each modified segment determined to have the highest probability and/or likelihood of no drift, a step value corresponding to the modified segment may be determined. For example, step 125 may correspond to modified segment 133.

At block 157, the drift amount for the segment (e.g., segment 130) may be determined based on the step values corresponding to the modified segments having the highest probability and/or likelihood of no drift. In one example, an average of the steps corresponding to the K segments having the highest probability of no drift may be calculated and the result may be determined to be the amount of drift (e.g., drift amount) corresponding to the segment. Using a similar approach, the drift amount for each segment in the subtitles 110 may be determined. Alternatively, a drift amount may be determined only for segments identified as having drift. A drift slope corresponding to each segment may further be determined. The drift slope may correspond to a rate of change between the drift amount of the segment in question, and the drift amount of the immediately succeeding segment. At block 158, blocks in a given segment for which drift is detected may be adjusted and/or otherwise modified to correct the drift based on the drift amount and/or the drift slope. It is understood that the probability of drift and the probability of no drift herein may be determined in the same manner in that the probability of drift may be determined from the probability of no drift and vice versa.

Illustrative Process and Use Cases

Figure 2:
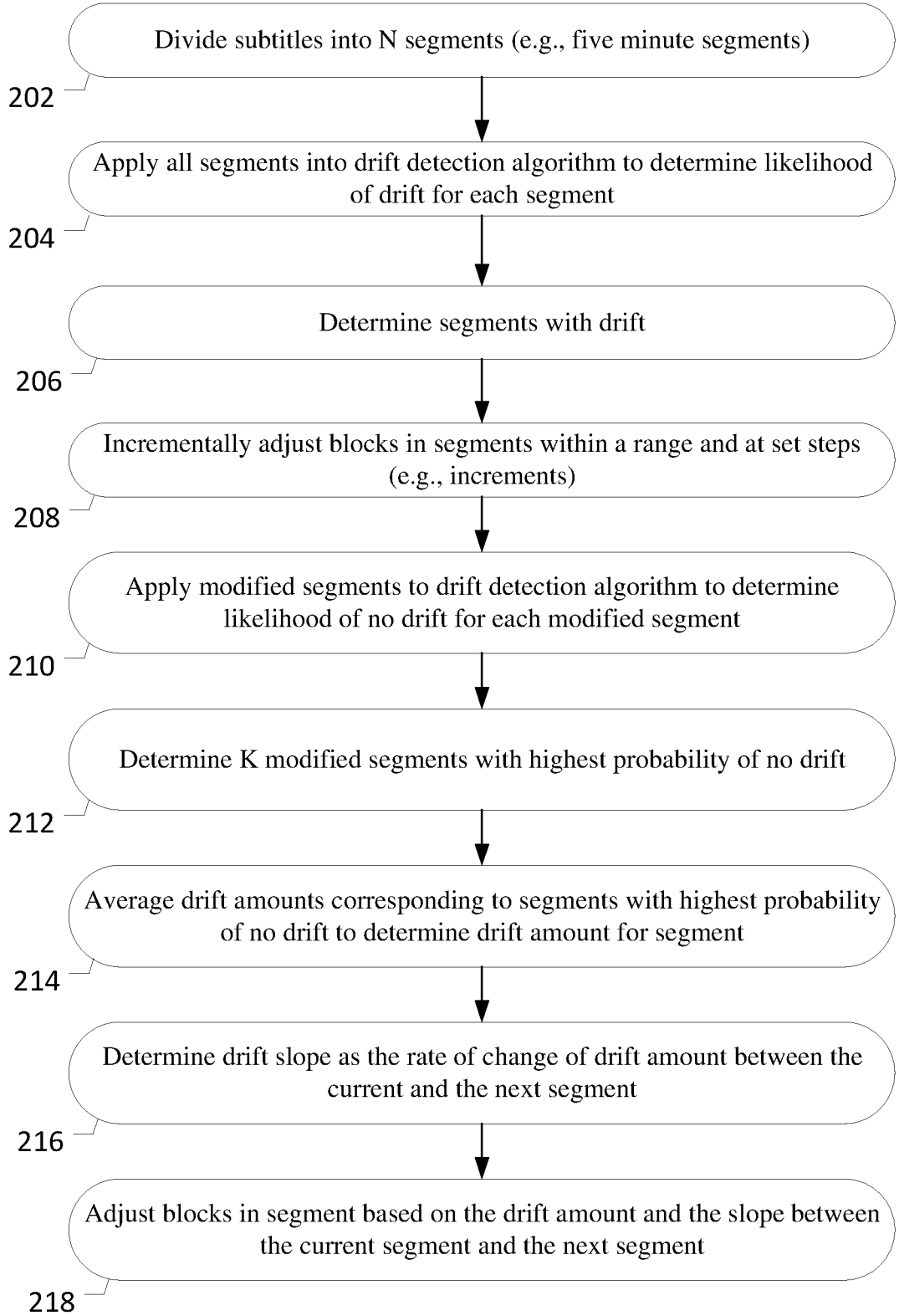
FIG. 2 illustrates an example process for subtitle drift detection and correction, in accordance with one or more example embodiments of the present disclosure.

FIG. 2 depicts example process flows for detecting and correcting drift in subtitles and/or captioning corresponding to dialog in media content. Some or all of the blocks of the process flows in this disclosure may be performed in a distributed manner across any number of devices. Some or all of the operations of the process flow may be optional and may be performed in a different order.

At block 202, computer-executable instructions stored on a memory of a device, such as a computing device (e.g., server), may be executed to divide subtitles corresponding to audio in media content into N segments. As explained above, computer systems (e.g., machine learning systems) may recognize spoken language presented and may translate the spoken language into subtitles. Subtitles may be determined and/or obtained and may be divided into N segments. For example, the subtitles may be divided in 5 minute segments or any other length (e.g., 1 minute, 3.5 minutes, 10 minutes, etc.). Each segment may have start and end times and each segment may include blocks corresponding to text representative of audio in the media content. The subtitles and thus the segments and the blocks may align with time points of the media content and may be arranged chronologically.

At block 204, computer-executable instructions stored on a memory of a device, such as a computing device (e.g., server), may be executed to apply the segments into a drift detection algorithm to determine the likelihood of drift for each segment. As explained above, the drift detection algorithm may output a likelihood of drift or a likelihood of no drift. From the likelihood of drift or a likelihood of no drift a probability that a corresponding segment has drift may be determined. For example, a 0.1 likelihood of no drift and a 0.9 likelihood of drift may both corresponding to a 90% probability of drift. For each segment, the likelihood and/or probability of drift may be determined.

At block 206, computer-executable instructions stored on a memory of a device, such as a computing device (e.g., server), may be executed to determine segments with drift. For example, a threshold value may be used to identify segments with drift. In one example, the threshold value may be set at 70% and any segments with 70% or higher probability (e.g., 0.7 likelihood of drift or 0.3 likelihood of no drift) may be determined to have drift. It is understood that any other threshold value may be used to determine drift. It is understood that steps 202-206 may be repeated using subtitles determined by human operators. Specifically, such human subtitles may be segmented and applied to the drift detection algorithm to determine the probability of drift and/or no drift.

At block 208, computer-executable instructions stored on a memory of a device, such as a computing device (e.g., server), may be executed to incrementally adjust blocks in segments determined to have drift. For segments determined to have drift, the blocks in each segment may be incrementally adjusted at certain steps and within a certain range to generate modified segments at each step. To generate modified segments, blocks in the segment may be shifted by a step value to create synthetic drift. In one example, the step value may be 100 milliseconds and the range may be between −10 and 10 seconds, resulting in 200 unique modified segments, each corresponding to a step. It is understood that the step and range may be any value such that the step is smaller than the range At block 210, computer-executable instructions stored on a memory of a device, such as a computing device (e.g., server), may be executed to apply modified segments to drift detection algorithm to determine likelihood of no drift for each modified segment. For example, after modifying the segment to create synthetic drift, the modified segment may be applied to the drift detection algorithm to determine a likelihood of drift or no drift to ultimately determine a probability of no drift.

At block 212, computer-executable instructions stored on a memory of a device, such as a computing device (e.g., server), may be executed to determine K modified segments corresponding to the highest probability of no drift. For example, the top 5 modified segments (e.g., K=5) with the highest probability of no drift may be determined. In the example where the step is 100 milliseconds and the range is between −10 and 10 seconds, the top 5 out of 200 modified segments having the highest probability of no drift will be determined.

At block 214, computer-executable instructions stored on a memory of a device, such as a computing device (e.g., server), may be executed to determine a drift amount corresponding to the segment. For example, the step corresponding to the top K modified segments with the highest probability of no drift may be averaged to determine the drift amount corresponding to the segment. As the steps adjust the positioning of the blocks to correct the drift, the average step amount may be the inverse of the drift amount. For example, a step of 500 milliseconds may correspond to a drift amount of −500 milliseconds as a step of 500 in the positive direction was required to offset a drift amount of −500. It is understood that an array of (N, K) may be determined where the drift amounts for each segment are provided in the same array. At block 216, computer-executable instructions stored on a memory of a device, such as a computing device (e.g., server), may be executed to determine drift slope for each segment for which drift was detected. Drift slope may be the rate of change of drift amount between the current segment and the next segment.

At block 218, computer-executable instructions stored on a memory of a device, such as a computing device (e.g., server), may be executed to correct drift in the segment for which drift was detected. For example, blocks in the segment may be adjusted based on the drift amount and the slope between the current segment and the next segment. In one example, drift correction coordinates for a an adjusted block (e.g., $AB_i$) may be determined using the formula below.

$$AB_i=[Start_i+DA+(Start_i*DS),End_i+DA+(End_i*DS)]$$

In the drift correction formula above, $Start_i$ may be the start time of the unmodified block, $End_i$ may be the start time of the unmodified block, DA may be the drift amount determined for the corresponding segment, and DS may be the drift slope determined for the corresponding segment and the immediately succeeding segment. Using the formula above, block $B_i$ may adjusted to reduce and/or eliminate drift in that block. It is understood that the same or a substantially similar approach to steps 202-218 may be employed for human subtitles to correct, remove and/or eliminate drift for human subtitles.

Figure 3:
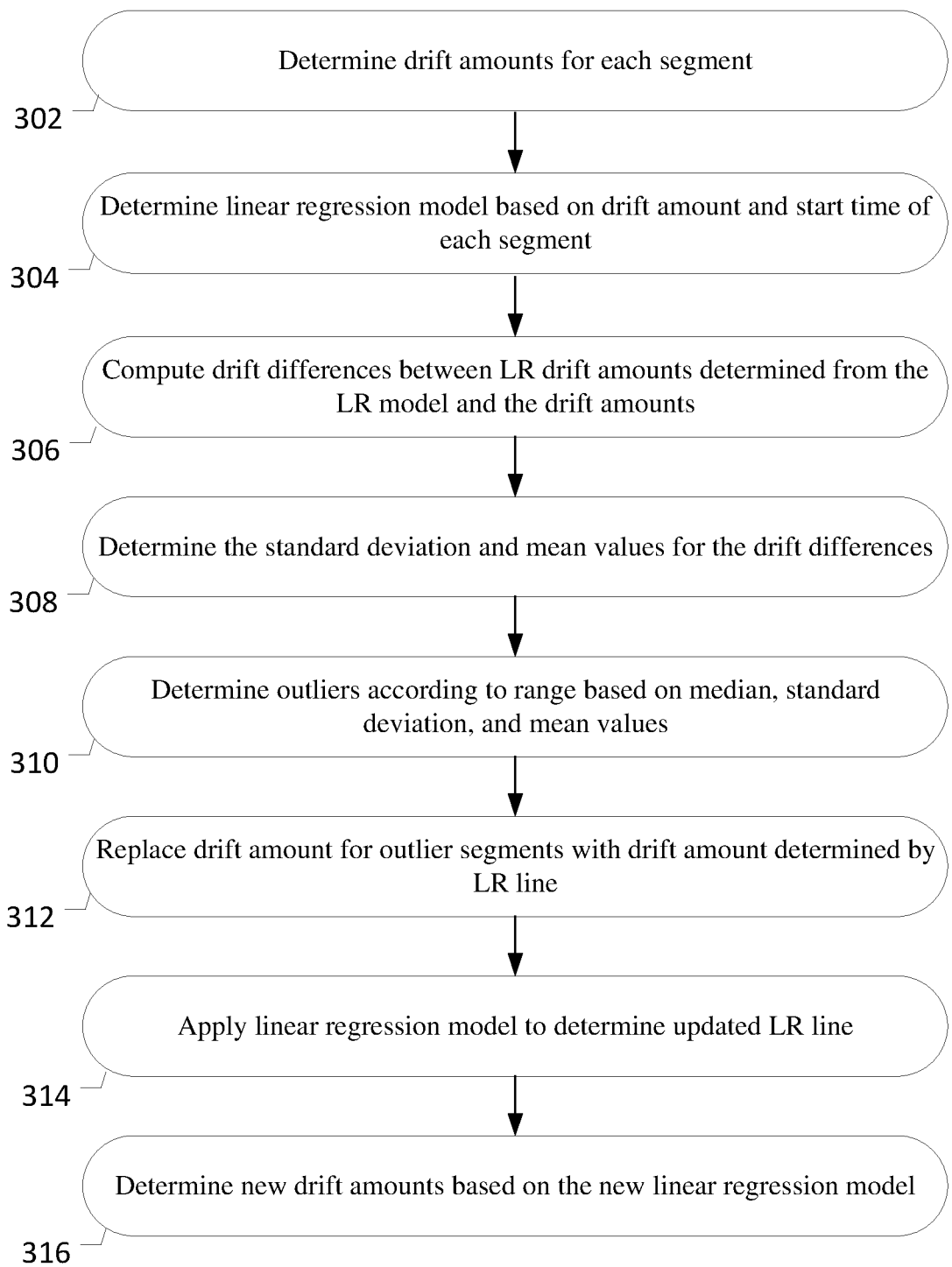
FIG. 3 illustrates an example process for subtitle outlier detection and correction, in accordance with one or more example embodiments of the present disclosure.

FIG. 3 depicts an example process flow for detecting segments with outlier drift amounts and determining new drift amounts for those segments based on a linear regression model for some or all segments of the subtitles corresponding to the media content. Drift amounts may occasionally be determined which are significantly different from drift amount of neighboring segments. These drift amounts may occur, for example, due to loud sounds or background noises (e.g., music) in the audio corresponding to the media content (e.g., fighting scenes with human noises such as grunts, pain noises). Some or all of the blocks of the process flows in this disclosure may be performed in a distributed manner across any number of devices. Some or all of the operations of the process flow may be optional and may be performed in a different order.

At block 302, computer-executable instructions stored on a memory of a device, such as a computing device (e.g., server), may be executed to determine drift amounts for each segment. Block 302 may be the same as blocks 208-214 of FIG. 2. At block 304, computer-executable instructions stored on a memory of a device, such as a computing device (e.g., server), may be executed to determine a linear regression model based on the drift amounts determined for each segment and the start time of each segment. For example, a linear regression model may be determined using $\|A-mX+b\|^2$, where X is the start time of the respective segment and A is the drift amount for a given segment. It is understood however, that other well-known linear regression methods and models may be used.

Figure 4A:
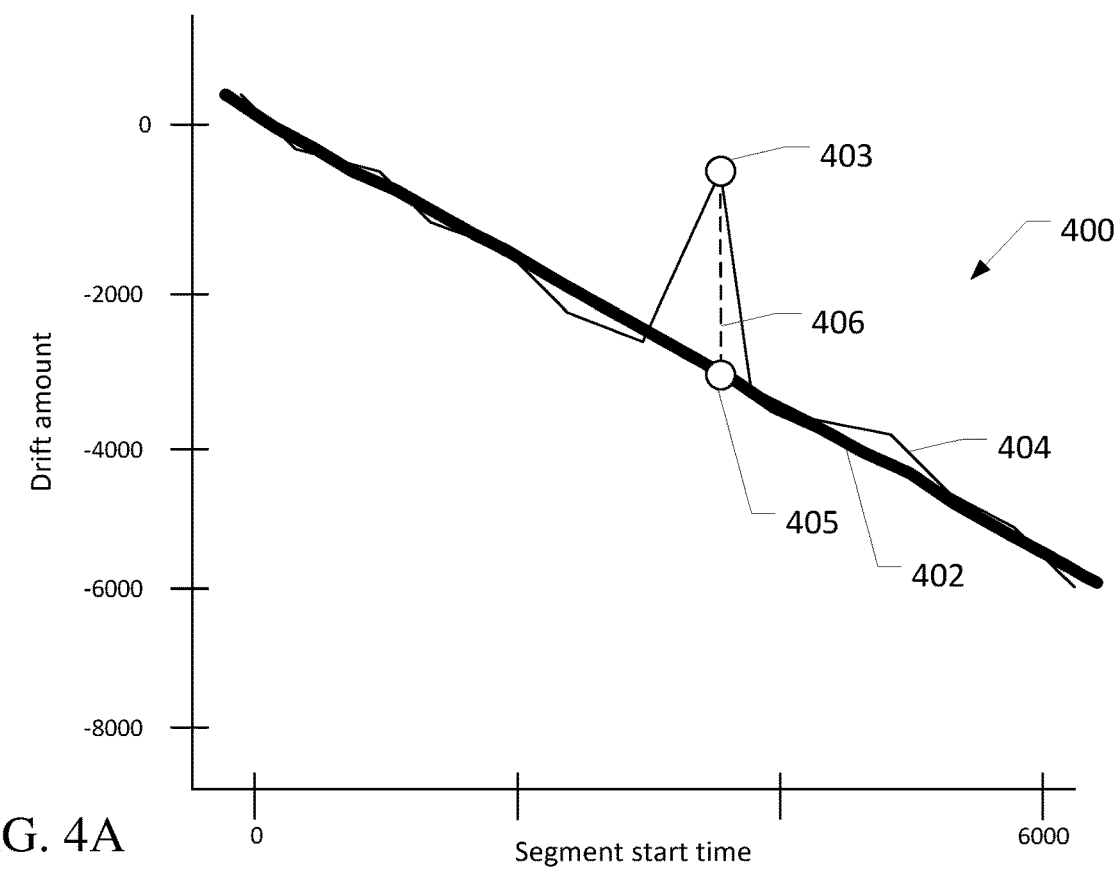
FIGS. 4A-B illustrate example plots of the drift amount for each segment as well as a corresponding linear regression, in accordance with one or more example embodiments of the present disclosure.

Referring now to FIG. 4A, a linear regression model is shown in plot 400 which illustrates the drift amount plotted against the segment start times. Specifically, line 404 illustrates the drift amount for each segment start time using the technique illustrated in FIG. 2 and described above. Linear regression line 402 illustrates the drift amount at each segment start time based on the linear regression model. For example, drift amount 403 corresponds to the drift amount for a segment determined using the technique illustrated in FIG. 2 and linear regression drift amount 405 is a corresponding linear regression drift amount for the same segment.

Referring again to FIG. 3, at block 306 computer-executable instructions stored on a memory of a device, such as a computing device (e.g., server), may be executed to determine for each segment start time, drift differences between the linear regression drift amounts based on the linear regression line and the drift amounts. For example, linear regression drift amounts at each segment starting time may be determined based on the linear regression model and may be compared to corresponding drift amounts at each segment starting time and the difference in the two values may be the drift difference for each segment.

Referring again to FIG. 4A, the linear regression drift distance 406 is illustrated and illustrates a significant distance drift amount 403 and linear regression drift amount 405. For example, line 406 may extend from a drift amount of −200 to a linear regression drift amount of −3000 milliseconds and thus the drift distance may be −2800 milliseconds.

Referring again to FIG. 3, at block 308 computer-executable instructions stored on a memory of a device, such as a computing device (e.g., server), may be executed to determine standard deviation, mean, and/or median values for the drift differences. At block 310 computer-executable instructions stored on a memory of a device, such as a computing device (e.g., server), may be executed to determine outlier drift amounts by calculating a range based on the media, standard deviation, and/or mean values of the drift distances. For example, the range may be calculated using [Mean−(2*Standard Deviation), Mean+(2*Standard Deviation)]. If a drift distance falls within the range for a given segment start time, then the drift amount corresponding to that segment may be determined to be an outlier. It is understood that any other range value, threshold, and/or calculation may be used to determine outliers.

At block 312 computer-executable instructions stored on a memory of a device, such as a computing device (e.g., server), may be executed to replace the drift amounts for segments identified as corresponding to outlier drift amounts based on the drift distance for the given segment. Specifically, for the drift amount plotted for each segment start time, the points and/or lines corresponding such drift amounts identified as outliers and may be replaced with points and/or lines corresponding to the linear regression line at the same segment (e.g., segment start time).

Figure 4B:
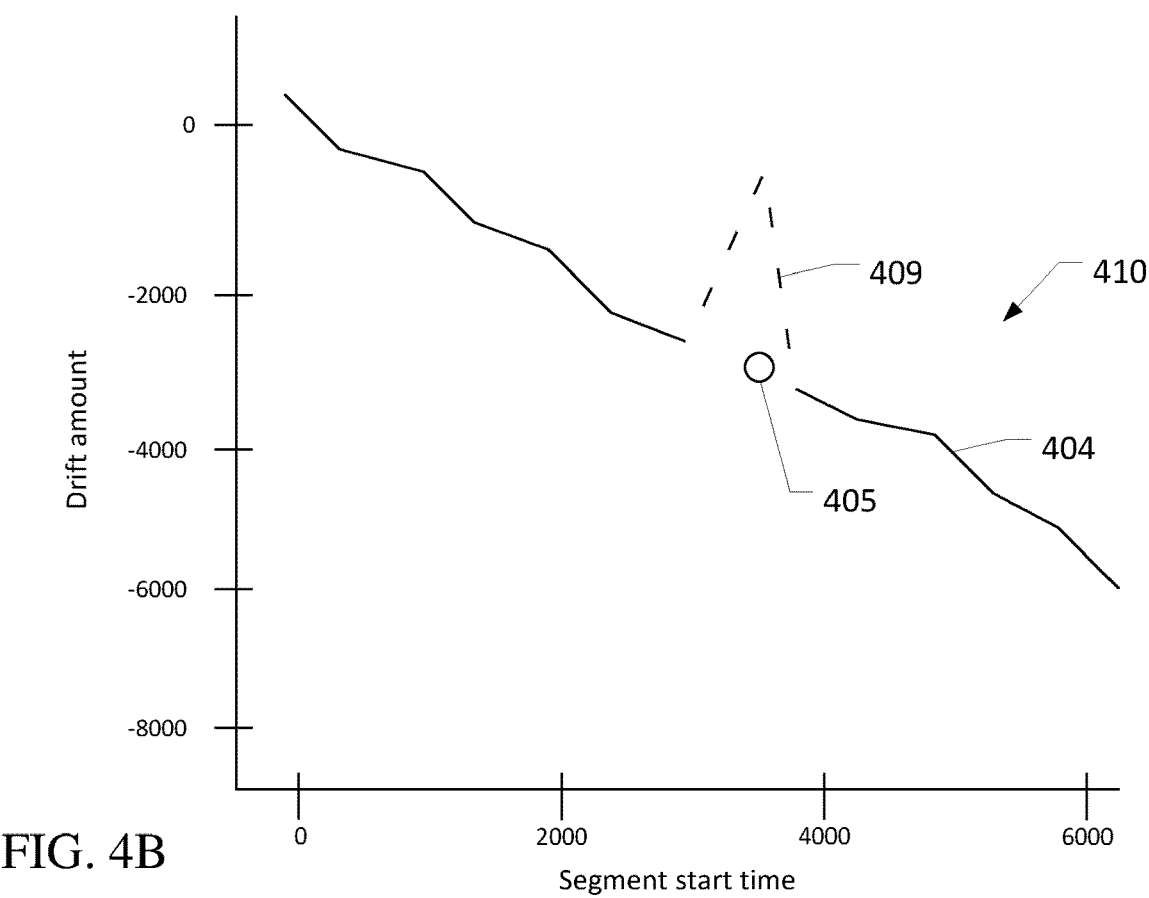

Referring now to FIG. 4B, the drift amount plotted against the segment start time for all segments in the media content as well as the linear regression drift amount 405 for the segment identified as corresponding to an outlier drift amount is plotted in plot 410. Like FIG. 4A, line 404 illustrates the drift amount for each segment start time using the technique illustrated in FIG. 2 and described above. Linear regression drift amount 405 illustrates the drift amount at the segment identified as corresponding to an outlier drift amount (e.g., drift amount 403). Line 409 represents the portion of line 404 corresponding to drift amount 403 which is being replaced by linear regression drift amount 405. In this manner, FIG. 4B illustrates a hybrid model for determining drift amounts.

Referring again to FIG. 3, at block 314 computer-executable instructions stored on a memory of a device, such as a computing device (e.g., server), may be executed to apply a linear regression model to the drift amounts and corresponding segment start times, with the outlier drift amounts replaced by the linear regression drift amounts. It is understood that the approaches described above with respect to block 304 may be used to fit the linear regression once more. At block 316, new drift amounts for each segment (e.g., segment start time) may be determined based on the updated linear regression model. For example, a drift amount based on the updated linear regression line generated by the updated linear regression model may be determined for each segment start time to determine new drift amounts for each segment. In one example, the new drift amounts may be used in the formula described above with respect to block 218 to correct drift in the segment. For example, for the segments for which drift is detected, the new drift amounts may be used to correct drift in those segments.

Figure 5:
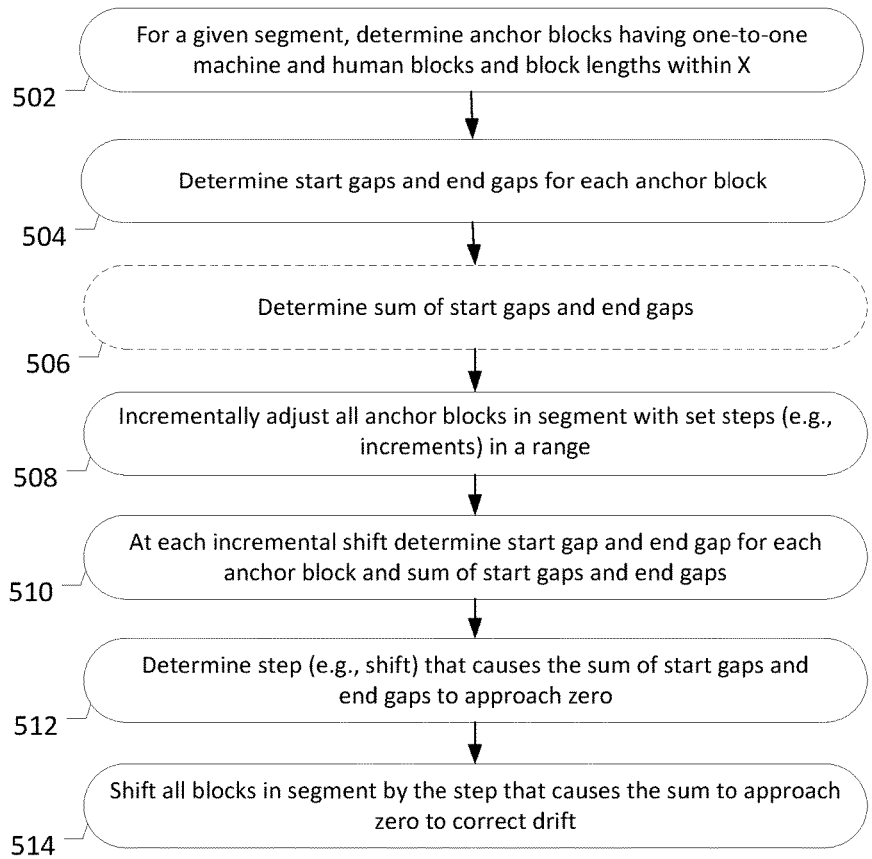
FIG. 5 illustrates an example process for fine tuning subtitle drift correction based on human blocks, in accordance with one or more example embodiments of the present disclosure.

FIG. 5 depicts an example process flow fine-tuning and/or improving drift correction techniques. For example, after performing the steps described above with respect to FIG. 2 and/or FIG. 3, the process set forth in FIG. 5 may be applied to further improve and/or optimize drift correction. Drift amounts may occasionally be determined which are significantly different from drift amount of neighboring segments. These drift amounts may occur, for example, due to loud sounds and/or background noises (e.g., music) in the audio of the media content (e.g., fighting scenes with human noises such as grunts, pain noises, for example). Some or all of the blocks of the process flows in this disclosure may be performed in a distributed manner across any number of devices. Some or all of the operations of the process flow may be optional and may be performed in a different order.

At block 502, computer-executable instructions stored on a memory of a device, such as a computing device (e.g., server), may be executed to determine anchor blocks for a given segment. For example, anchor blocks may be determined by mapping machine blocks (e.g., blocks) to human blocks corresponding to a given segment. Each anchor block may have one or more anchor points. As explained above, human blocks may be determined and/or generated by human operators. The human blocks may correspond to human subtitles and may further correspond to a human segment. The human subtitles may be segmented in a manner similar to the machine subtitles (e.g., 5 minute segments). Similarly, the human segments may also be processed by the drift detection algorithm to determine a likelihood of drift or no drift. Human blocks may indicate probabilities that subtitles occur in corresponding audio blocks for the same media content used to determine and/or generate the machine blocks. In this manner, a block (e.g., machine block) may refer to a computer-generated block of audio that corresponds to a portion of a media content (e.g., video), and for which a probability may indicate the likelihood that audio/voices are presented during the block of media content. A human block may refer to a block of audio that corresponds to a portion of the media content used to generate the machine block, and during which subtitles for the media content are present.

To map the machine blocks to human blocks for a given segment, machine blocks and human blocks may be positioned with respect to time (e.g., start and end time in the time frame of the media content), and machine blocks overlapping in time with only one human block may be identified as mapped machine blocks. To determine anchor blocks, the lengths of the mapped machine blocks and human blocks may be compared to determine if the difference in the lengths falls within a certain range and/or satisfies a threshold value. The mapped machine blocks having a block length that is within a certain range or satisfies a threshold value of the corresponding human block may be identified as an anchor block.

Figure 6:
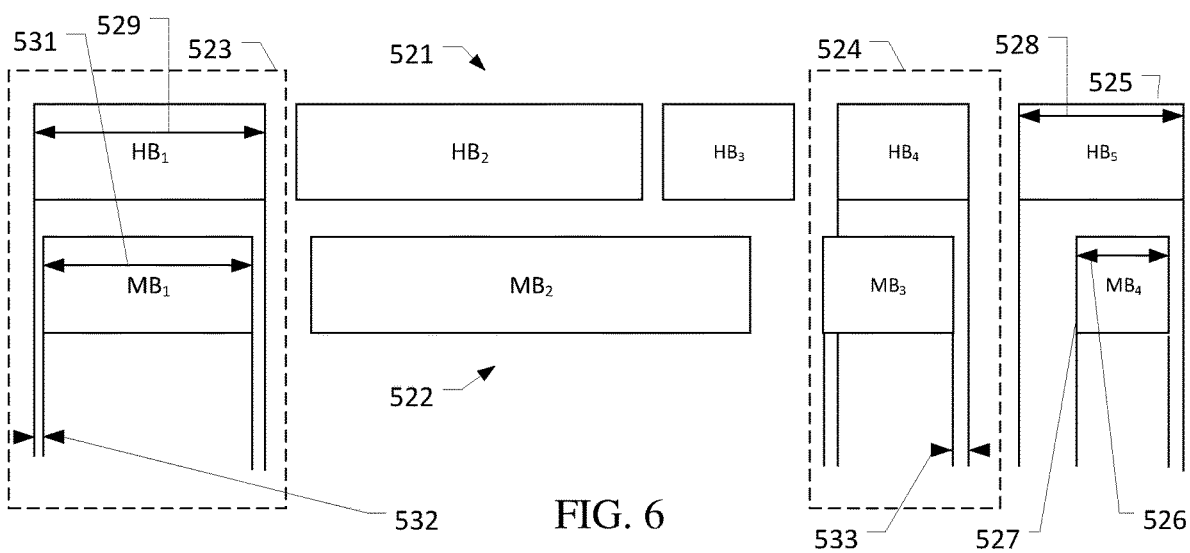
FIG. 6 illustrates an example schematic of machine blocks mapped to human blocks, in accordance with one or more example embodiments of the present disclosure.

Referring now to FIG. 6, human blocks 521 and corresponding machine blocks 522 are illustrated for a given segment. As shown in FIG. 6, human blocks 521 and machine blocks 522 may be positioned based on start and end points for each respective block. The start and end points may correspond to time points in the media content, and specifically dialog, associated the text in human blocks 521 and machine blocks 522. To determine mapped machine blocks, machine blocks (e.g., blocks) that overlap over one human block may be identified. For example, the machine block in section 523 may overlap with only one human block. Similarly, the machine block in section 524 may overlap with only one human block. Also, machine block 527 may overlap with only one human block (e.g., human block 525). The other machine block of machine blocks 522 may map to more than one human block of human block 521.

To determine anchor blocks, the lengths of the machine blocks 522 and human blocks 521 that have a one-to-one mapping may be determined. For example, lengths 529 and 531 of the blocks in section 523 may be determined and lengths 528 and 526 of human block 525 and machine block 527, respectively, may be determined. As, the lengths of machine block 527 and human block 528 are significantly different, the difference between lengths 528 and 526 may fall outside a range and/or threshold value and thus machine block 527 may be determined to not be an anchor block, despite the one-to-one mapping with human block 525. On the other hand, lengths 529 and 531 of the human block and machine block in section 523, respectively, may be determined to fall within the range and/or to satisfy the threshold value. For example, the range may be less than or equal to 500 ms. The machine blocks 522 having a one-to-one mapping to a human block of human blocks 521 and having a length that is within the range and/or threshold of the corresponding length of the human block for which it is mapped may be determined to be anchor blocks. For example, the machine blocks 522 in segments 523 and 524 may be determined to have one-to-one mapping and have lengths within a range of the lengths of the mapped human block and thus may be determined to be anchor blocks.

Referring again to FIG. 5, at block 504, computer-executable instructions stored on a memory of a device, such as a computing device (e.g., server), may be executed to determine start gaps and end gaps for each anchor block. A start gap may be the difference between the start time of a human block and the start time of a machine block mapped to the human block. As explained above, the start gap represents a time gap from the start of a human block having spoken audio to the time when the overlapping machine block having spoken audio begins. An end gap may be the difference between the end time of a human block and the end time of a machine block mapped to the human block. An end gap may represent a time gap from the end of the human block having spoken audio to the time when the overlapping machine block having spoken audio ends.

Referring again to FIG. 6, start gap 532 may be determined based on the difference between the start times of the machine block and the human block in section 523. Similarly, end gap 533 may be determined based on the difference between the end time of the machine block and the human block in section 524. The start and end gaps may indicate times when a voice is present in the audio content for a video, but a subtitle is not present.

Referring again to FIG. 5, at optional block 506, computer-executable instructions stored on a memory of a device, such as a server, may be executed to determine the sum of the start gaps and the end gaps for all anchor blocks in a given segment. At block 508, computer-executable instructions stored on a memory of a device, such as a computing device (e.g., server), may be executed to incrementally shift machine blocks that anchor blocks by a set amount (e.g., increment) in a given range. Block 508 may be the same or similar to block 208. For example, blocks in a segment may be incrementally adjusted at certain steps and within a certain range. In one example, the machine blocks may be shifted in steps of 50 milliseconds in a range from −1000 to +1000 milliseconds.

At block 510, computer-executable instructions stored on a memory of a device, such as a computing device (e.g., server), may be executed to determine the start gaps and end gaps for anchor blocks in a given segment at each corresponding step. For each step, the start gaps and end gaps may be summed. At block 512, computer-executable instructions stored on a memory of a device, such as a computing device (e.g., server), may be executed to determine the step or steps that cause the sum value determined at each incremental step within the range to approach zero. In other words, the step or steps that cause the smallest sum value or values may be determined (e.g., as compared to the sum value determined at block 506). For example, the step that results in the sum of the start gaps and the end gaps to be the closest to zero of all sum values for all steps may be determined. In another example, the top X steps that result sums of start gaps and the end gaps to be the closest to zero may be determined. For example, X may be 5 or any other number. Where multiple steps are determined, the average step value (e.g., incremental shift) may be determined.

At block 514, computer-executable instructions stored on a memory of a device, such as a computing device (e.g., server), may be executed to shift all blocks in the given segment by the step value (e.g., incremental shift), or average step value, that causes the sum of the start and end gaps to approach zero. Where the average step value is determined at block 512, the average step value may be used to shift all blocks. As explained above, this shift may be used to further correct the shift correction applied using the methods and techniques described above with respect to FIGS. 2 and/or 3.

Illustrative Device Architecture

Figure 7:
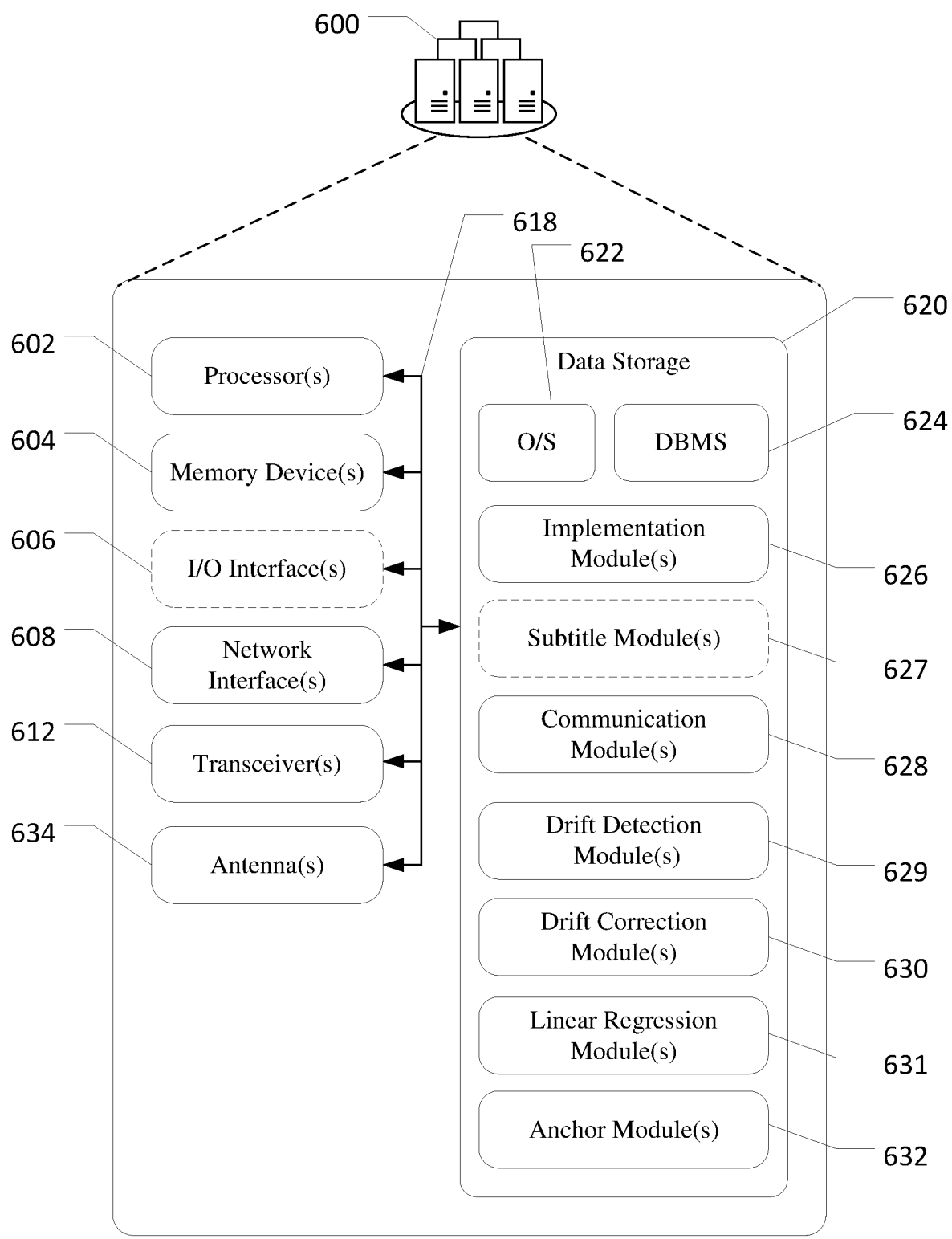
FIG. 7 illustrates a schematic diagram of a server in accordance with one or more example embodiments of the disclosure.

FIG. 7 is a schematic block diagram of an illustrative sever 600 in accordance with one or more example embodiments of the disclosure. The server 600 may be one or more servers and may include any suitable computing device capable of receiving and/or sending data, and may optionally be coupled to devices including, but not limited to, electronic devices such as a connected device, smartphone, tablet, smart television, e-reader, one or more user devices (e.g., wearable devices and/or smart sensors), a desktop computer, a laptop computer, one or more servers, datastores, or the like. The server 600 may correspond to an illustrative device configuration for any other servers of FIGS. 1-6. While FIG. 7 may correspond to a server (e.g., server 600), it is understood that FIG. 7 may correspond to any other computing device (e.g. servers, electronic devices, computer devices, user devices, or the like).

The server 600 may be configured to communicate via one or more networks with one or more servers, electronic devices, user devices, or the like. Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the server 600 may include one or more processors (processor(s)) 602, one or more memory devices 604 (generically referred to herein as memory 604), one or more of the optional input/output (I/O) interface(s) 606, one or more network interface(s) 608, one or more transceivers 612, and one or more antenna(s) 634. The server 600 may further include one or more buses 618 that functionally couple various components of the server 600. The server 600 may further include one or more antenna(e) 634 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals including BLE signals, a Near Field Communication (NFC) antenna for transmitting or receiving NFC signals, a 900 MHz antenna, and so forth. These various components will be described in more detail hereinafter.

The bus(es) 618 may include at least one of a system bus, a memory bus, an address bus, or a message bus, and may permit exchange of information (e.g., data (including computer-executable code), signaling, etc.) between various components of the server 600. The bus(es) 618 may include, without limitation, a memory bus or a memory controller, a peripheral bus, an accelerated graphics port, and so forth. The bus(es) 618 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 604 of the server 600 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 604 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 620 may include removable storage and/or non-removable storage including, but not limited to, magnetic storage, optical disk storage, and/or tape storage. The data storage 620 may provide non-volatile storage of computer-executable instructions and other data. The memory 604 and the data storage 620, removable and/or non-removable, are examples of computer-readable storage media (CRSM) as that term is used herein.

The data storage 620 may store computer-executable code, instructions, or the like that may be loadable into the memory 604 and executable by the processor(s) 602 to cause the processor(s) 602 to perform or initiate various operations. The data storage 620 may additionally store data that may be copied to memory 604 for use by the processor(s) 602 during the execution of the computer-executable instructions. Moreover, output data generated as a result of execution of the computer-executable instructions by the processor(s) 602 may be stored initially in memory 604, and may ultimately be copied to data storage 620 for non-volatile storage.

More specifically, the data storage 620 may store one or more operating systems (O/S) 622; one or more database management systems (DBMS) 624; and one or more program module(s), applications, engines, computer-executable code, scripts, or the like such as, for example, one or more implementation module(s) 626, one or more optional subtitle module(s) 627, one or more communication module(s) 628, one or more drift detection module(s) 629, one or more drift correction module(s) 630, one or more linear regression module(s) 631, and/or one or more anchor module(s) 632. Some or all of these module(s) may be sub-module(s). Any of the components depicted as being stored in data storage 620 may include any combination of software, firmware, and/or hardware. The software and/or firmware may include computer-executable code, instructions, or the like that may be loaded into the memory 604 for execution by one or more of the processor(s) 602. Any of the components depicted as being stored in data storage 620 may support functionality described in reference to correspondingly named components earlier in this disclosure.

The data storage 620 may further store various types of data utilized by components of the server 600. Any data stored in the data storage 620 may be loaded into the memory 604 for use by the processor(s) 602 in executing computer-executable code. In addition, any data depicted as being stored in the data storage 620 may potentially be stored in one or more datastore(s) and may be accessed via the DBMS 624 and loaded in the memory 604 for use by the processor(s) 602 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 7, the datastore(s) may include, for example, user preference information, user contact data, device pairing information, and other information.

The processor(s) 602 may be configured to access the memory 604 and execute computer-executable instructions loaded therein. For example, the processor(s) 602 may be configured to execute computer-executable instructions of the various program module(s), applications, engines, or the like of the server 600 to cause or facilitate various operations to be performed in accordance with one or more embodiments of the disclosure. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), an application-specific integrated circuit, a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to functionality supported by the various program module(s) depicted in FIG. 7, the implementation module(s) 626 may include computer-executable instructions, code, or the like that responsive to execution by one or more of the processor(s) 602 may perform functions including, but not limited to, overseeing coordination and interaction between one or more modules and computer executable instructions in data storage 620, determining actions and tasks, determining actions associated with user interactions, determining actions associated with messages, commands, instructions and the like. Implementation module 626 may further coordinate with communication module 628 to send messages to and receive messages from another computing device (e.g., electronic device, smart phone, connected device, tablet, laptop computer, desktop computer, smart television, wearable device, and the like).

The optional subtitle module(s) 627 may include computer-executable instructions, code, or the like that responsive to execution by one or more of the processor(s) 602 may perform functions including, but not limited to, generating subtitles based on media content. For example, subtitle module 627 may use speech recognition to process dialog in media content and generate and/or determine subtitles. For example, some computer systems (e.g., machine learning systems) may recognize spoken language presented and may translate the spoken language into subtitles.

The communication module(s) 628 may include computer-executable instructions, code, or the like that responsive to execution by one or more of the processor(s) 602 may perform functions including, but not limited to, communicating with one or more devices, for example, via wired or wireless communication, communicating with electronic devices, communicating with one or more servers (e.g., remote servers), communicating with remote datastores and/or databases, sending or receiving notifications or commands/directives, communicating with cache memory data, and the like.

The drift detection module(s) 629 may include computer-executable instructions, code, or the like that responsive to execution by one or more of the processor(s) 602 may perform functions including, but not limited to, detect drift in one or more segments of subtitles by analyzing each segment to determine a likelihood and/or probability of drift or no drift. The drift detection module 629 may be the same as drift detection module 120 described above with respect to FIG. 1.

The drift correction module(s) 630 may include computer-executable instructions, code, or the like that responsive to execution by one or more of the processor(s) 602 may perform functions including, but not limited to, correct drift detected in one or more segments. For example the drift correction module may incrementally adjust blocks in a given segment to determine a drift amount and drift slope for the segments and/or may correct the drift in the segment based on the drift amount and drift slope. The drift correction module may further correct drift based on the drift amounts and/or correction amounts determined by linear regression model 631 and anchor block module 632.

The linear regression module(s) 631 may include computer-executable instructions, code, or the like that responsive to execution by one or more of the processor(s) 602 may perform functions including, but not limited to, applying a linear regression model to segments with corresponding drift amounts to fit a linear regression line and ultimately eliminate outlier drift amounts based on the linear regression line. Upon removing the outliers, the linear regression module may fit a second linear regression line to determine new drift amounts.

The anchor block module(s) 632 may include computer-executable instructions, code, or the like that responsive to execution by one or more of the processor(s) 602 may perform functions including, but not limited to, determining anchor blocks by comparing machine blocks (e.g., blocks) to human blocks. The anchor blocks may be used to determine start gaps and end gaps for incrementally adjusted machine blocks and ultimately determine a new drift amount based on the start gaps and end gaps.

Referring now to other illustrative components depicted as being stored in the data storage 620, the O/S 622 may be loaded from the data storage 620 into the memory 604 and may provide an interface between other application software executing on the server 600 and hardware resources of the server 600. More specifically, the O/S 622 may include a set of computer-executable instructions for managing hardware resources of the server 600 and for providing common services to other application programs (e.g., managing memory allocation among various application programs). In certain example embodiments, the O/S 622 may control execution of the other program module(s) to for content rendering. The O/S 622 may include any operating system now known or which may be developed in the future including, but not limited to, any server operating system, any mainframe operating system, or any other proprietary or non-proprietary operating system.

The DBMS 624 may be loaded into the memory 604 and may support functionality for accessing, retrieving, storing, and/or manipulating data stored in the memory 604 and/or data stored in the data storage 620. The DBMS 624 may use any of a variety of database models (e.g., relational model, object model, etc.) and may support any of a variety of query languages. The DBMS 624 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like.

Referring now to other illustrative components of the server 600, the optional input/output (I/O) interface(s) 606 may facilitate the receipt of input information by the server 600 from one or more I/O devices as well as the output of information from the server 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the server 600 or may be separate. The I/O devices may further include, for example, any number of peripheral devices such as data storage devices, printing devices, and so forth.

The optional I/O interface(s) 606 may also include an interface for an external peripheral device connection such as universal serial bus (USB), FireWire, Thunderbolt, Ethernet port or other connection protocol that may connect to one or more networks. The optional I/O interface(s) 606 may also include a connection to one or more of the antenna(e) 634 to connect to one or more networks via a wireless local area network (WLAN) (such as Wi-Fi®) radio, Bluetooth, ZigBee, and/or a wireless network radio, such as a radio capable of communication with a wireless communication network such as a Long Term Evolution (LTE) network, WiMAX network, 3G network, ZigBee network, etc.

The server 600 may further include one or more network interface(s) 608 via which the server 600 may communicate with any of a variety of other systems, platforms, networks, devices, and so forth. The network interface(s) 608 may enable communication, for example, with one or more wireless routers, one or more host servers, one or more web servers, and the like via one or more of networks.

The antenna(e) 634 may include any suitable type of antenna depending, for example, on the communications protocols used to transmit or receive signals via the antenna (e) 634. Non-limiting examples of suitable antennas may include directional antennas, non-directional antennas, dipole antennas, folded dipole antennas, patch antennas, multiple-input multiple-output (MIMO) antennas, or the like. The antenna(e) 634 may be communicatively coupled to one or more transceivers 612 or radio components to which or from which signals may be transmitted or received.

As previously described, the antenna(e) 634 may include a Bluetooth antenna configured to transmit or receive signals in accordance with established standards and protocols, such as Bluetooth and/or BLE. Alternatively, or in addition to, antenna(e) 634 may include cellular antenna configured to transmit or receive signals in accordance with established standards and protocols, such as or cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like. The antenna(e) 634 may additionally, or alternatively, include a Wi-Fi® antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 634 may be configured to transmit or receive radio frequency signals within any suitable frequency range forming part of the unlicensed portion of the radio spectrum (e.g., 900 MHz).

The antenna(e) 634 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 612 may include any suitable radio component(s) for—in cooperation with the antenna(e) 634—transmitting or receiving radio frequency (RF) signals in the bandwidth and/or channels corresponding to the communications protocols utilized by the server 600 to communicate with other devices. The transceiver(s) 612 may include hardware, software, and/or firmware for modulating, transmitting, or receiving—potentially in cooperation with any of antenna(e) 634—communications signals according to any of the communications protocols discussed above including, but not limited to, one or more Wi-Fi® and/or Wi-Fi® direct protocols, as standardized by the IEEE 802.11 standards, one or more non-Wi-Fi® protocols, or one or more cellular communications protocols or standards. The transceiver(s) 612 may further include hardware, firmware, or software for receiving GNSS signals. The transceiver(s) 612 may include any known receiver and baseband suitable for communicating via the communications protocols utilized by the server 600. The transceiver(s) 612 may further include a low noise amplifier (LNA), additional signal amplifiers, an analog-to-digital (A/D) converter, one or more buffers, a digital baseband, or the like.

It should be appreciated that the program module(s), applications, computer-executable instructions, code, or the like depicted in FIG. 7 as being stored in the data storage 620 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the server 600 and/or hosted on other computing device(s) accessible via one or more networks, may be provided to support functionality provided by the program module(s), applications, or computer-executable code depicted in FIG. 7 and/or additional or alternate functionality. Further, functionality may be modularized differently such that processing described as being supported collectively by the collection of program module(s) depicted in FIG. 7 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 7 may be implemented, at least partially, in hardware and/or firmware across any number of devices.

It should further be appreciated that the server 600 may include alternate and/or additional hardware, software, or firmware components beyond those described or depicted without departing from the scope of the disclosure. More particularly, it should be appreciated that software, firmware, or hardware components depicted as forming part of the server 600 are merely illustrative and that some components may not be present or additional components may be provided in various embodiments. While various illustrative program module(s) have been depicted and described as software module(s) stored in data storage 620, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
   determining text data corresponding to dialog in media content;
   dividing the text data into segments including blocks of text data that correspond to the dialog at time points;
   analyzing a first segment of the segments using a drift detection algorithm to determine a first likelihood of drift value indicative of drift, wherein drift corresponds to a misalignment between the text data and the dialog at the time points in the segment;
   determining that the first likelihood of drift value corresponding to the first segment of the segments satisfies a first threshold value;
   adjusting, incrementally, blocks of text data in the first segment by step values within a range to determine modified segments including a first modified segment corresponding to a first step value and a second modified segment corresponding to a second step value;
   analyzing the first modified segment and the second modified segment using the drift detection algorithm to determine a second likelihood of drift value corresponding to the first modified segment and a third likelihood of drift value corresponding the second modified segment;
   determining a second threshold value;
   determining that the second likelihood of drift value and third likelihood of drift value satisfy the second threshold value;
   calculating a first drift value for the first segment based on the first step value and the second step value; and
   correcting the first segment by adjusting the blocks of text data at the time points based on the first drift value.

2. The method of claim 1, further comprising:
   determining a second drift value corresponding to a second segment occurring immediately after the first segment; and
   determining a drift slope value as a rate of change of drift between the first drift value and the second drift value; wherein the blocks of text data in the first segment are also adjusted based on the drift slope value.

3. The method of claim 1, further comprising:
   determining a first linear regression model based on start and end times of the segments and drift values corresponding to the segments;
   determining a first drift differences between the first drift value and the linear regression model;
   determining that the first drift differences satisfies a drift difference threshold value;
   determining a second linear regression model based on the first linear regression model and the first drift distance; and
   determining a second drift amount corresponding to the first segment based on the second linear regression model.

4. The method of claim 1, further comprising:
   determining, for the first segment, human blocks corresponding to the blocks of text data at the time points and based on subtitles;
   determining a first block overlapping in time with only one human block and having a block length within a threshold value of a human block length of the overlapping human block;
   adjusting the first block of the first segment by a third step value to determine a second segment;
   determining, for the second segment, a gap value between the one overlapping human block and the first block;
   determine the gap value is indicative of a reduction of drift for the first segment; and
   adjusting the blocks of text data in the first segment by the third step value.

5. A method comprising:
   determining text data corresponding to dialog in media content;
   determining segments of the text data, a first segment of the segments including blocks of text data corresponding to the media content at time points;
   analyzing the first segment to determine a first likelihood of drift value;
   determining the first segment includes drift based on the first likelihood of drift value, wherein drift is a misalignment between the text data and the dialog at the time points;
   adjusting, incrementally, a position of one or more of the blocks of text data in the first segment to determine a second segment based on the first segment;
   determining a second likelihood of drift value for the second segment, the second likelihood of drift value indicative of alignment between the text data in the second segment and the dialog; and
   determining a correction amount to correct drift in the first segment, the correction amount based on the second segment.

6. The method of claim 5, further comprising:
   determining a first step value to adjust the position of the blocks of text data in the first segment;
   determining a drift threshold value indicative of synchronization between the text data in the second segment and the dialog; and
   determining that the second likelihood of drift value satisfies the drift threshold value; and
   determining a first drift amount for the first segment based on the first step value.

7. The method of claim 6, further comprising:
   determining a third segment of the segments including second blocks of text data;

determining a second step value to incrementally adjust a position of the second blocks of text data in the second segment;
adjusting, incrementally, the position of the second blocks of text data by the second step value to determine a fourth segment based on the second segment;
determining a third likelihood of drift value for the fourth segment indicative of alignment between the text data in the fourth segment and the dialog; and
determining that the third likelihood of drift value satisfies the drift threshold; and
determining a second drift amount for the third segment based on the second step value; and
determining a slope value based on a rate of change of drift between the first drift amount and the second drift amount.

8. The method of claim 7, wherein the correction amount for the first segment is based on the first drift amount and the slope value.

9. The method of claim 7, further comprising shifting the position of the blocks of text data of the first segment by a sum of the first drift amount and the first drift amount multiplied by the slope value.

10. The method of claim 5, wherein the position of the blocks of text data in the first segment is incrementally adjusted by steps of 100 ms in a range between −10 seconds and 10 seconds.

11. Method of claim 5, further comprising:
determining a step value to incrementally adjust the position of the blocks of text data in the first segment;
determining a first drift amount based on the step value, the drift amount indicative of misalignment with the dialog for the first segment;
determining a second drift amount corresponding to the first segment and based on a linear regression model based on the segments;
determining a drift difference between the first drift amount and the second drift amount; and
determining that the drift difference satisfies a drift difference threshold value.

12. The method of claim 11, further comprising:
determining a second linear regression model based on the segments and the second drift amount; and
determining a third drift amount for the first segment based on the second linear regression model.

13. The method of claim 5, further comprising:
determining, for the first segment, human blocks based on subtitles corresponding to the media content at the time points, the human blocks having human start times and a human end times, wherein the blocks of text data have a machine start times and a machine end times;
determining alignment of the human blocks with respect to the blocks of text data based on the human start times, a human end times, machine start times and a machine end times;
determining, for the first segment, a first block of the blocks of text of data having only one overlapping human block; and
determining that the first block has a length within a length threshold value of the one overlapping human block.

14. The method of claim 13, further comprising:
adjusting, incrementally, the first block by a step value to determine a third segment;
determining, for the third segment, a gap value between the one overlapping human block and the first block;
determining the gap value is indicative of a reduction of drift for the first segment; and
adjusting the blocks of text data in the first segment by the step value.

15. A system comprising:
memory configured to store computer-executable instructions, and
at least one computer processor configured to access memory and execute the computer-executable instructions to:
determine text data corresponding to dialog in media content;
determine segments of the text data, a first segment of the segments including blocks of text data corresponding to the media content at time points;
analyze the first segment to determine a first likelihood of drift value;
determine the first segment includes drift based on the first likelihood of drift value, wherein drift is a misalignment between the text data and the dialog at the time points;
adjust, incrementally, a position of one or more of the blocks of text data in the first segment to determine a second segment based on the first segment;
determine a second likelihood of drift value for the second segment, the second likelihood of drift value indicative of alignment between the text data in the second segment and the dialog; and
determine a correction amount for the first segment based on the second segment.

16. The system of claim 15, wherein the at least one computer processor is further configured to access memory and execute the computer-executable instructions to:
determine a first step value to adjust the position of the blocks of text data in the first segment;
determine a drift threshold value indicative of synchronization between the text data in the second segment and the dialog;
determine that the second likelihood of drift value satisfies the drift threshold value; and
determine a first drift amount for the first segment based on the first step value.

17. The system of claim 15, wherein the at least one computer processor is further configured to access memory and execute the computer-executable instructions to:
determine a step value to incrementally adjust the position of the blocks of text data in the first segment;
determine a first drift amount based on the step value, the drift amount indicative of misalignment with the dialog for the first segment;
determine a second drift amount corresponding to the first segment and based on a linear regression model based on the segments;
determine a drift difference between the first drift amount and the second drift amount; and
determine that the drift difference satisfies a drift difference threshold value.

18. The system of claim 17, wherein the at least one computer processor is further configured to access memory and execute the computer-executable instructions to:
determine a second linear regression model based on the segments and the second drift amount; and
determine a third drift amount for the first segment based on the second linear regression model.

19. The system of claim 15, wherein the at least one computer processor is further configured to access memory and execute the computer-executable instructions to:

determine, for the first segment, human blocks based on subtitles corresponding to the media content at the time points, the human blocks having human start times and a human end times, wherein the blocks of text data have a machine start times and a machine end times;

determine alignment of the human blocks with respect to the blocks of text data based on the human start times, a human end times, machine start times and a machine end times;

determine, for the first segment, a first block of the blocks of text of data having only one overlapping human block; and determine that the first block has a length within a length threshold value of the one overlapping human block.

20. The system of claim 19, wherein the at least one computer processor is further configured to access memory and execute the computer-executable instructions to:

adjust, incrementally, the first block by a step value to determine a third segment;

determine, for the third segment, a gap value between the one overlapping human block and the first block;

determine the gap value is indicative of a reduction of drift for the first segment; and adjusting the blocks of text data in the first segment by the step value.

* * * * *